United States Patent
White et al.

[11] 3,888,070
[45] June 10, 1975

[54] SADDLE TREES AND SADDLES

[75] Inventors: Robert Eric White, Hounslow; Robert Oscar Lightfoot, Croydon, both of England

[73] Assignee: White Polytechniques Limited, London, England

[22] Filed: June 11, 1973

[21] Appl. No.: 368,529

[30] Foreign Application Priority Data
June 9, 1972 United Kingdom............ 27029/72
Sept. 1, 1972 United Kingdom............ 40696/72
Sept. 4, 1972 United Kingdom............ 40982/72

[52] U.S. Cl. .................................................. 54/44
[51] Int. Cl. ............................................ B68c 1/00
[58] Field of Search .......................... 54/44, 41

[56] References Cited
UNITED STATES PATENTS

| | | |
|---|---|---|
| 3,293,828 | 12/1966 | Hessler .................. 54/44 |
| 3,529,402 | 9/1970 | Queen .................... 54/44 |
| 3,698,608 | 10/1972 | Entwistle ................ 54/44 |
| 3,712,024 | 1/1973 | Nankivell ................ 54/44 |

*Primary Examiner*—Hugh R. Chamblee
*Assistant Examiner*—J. Q. Lever
*Attorney, Agent, or Firm*—Karl W. Flocks

[57] ABSTRACT

This invention concerns methods of making saddle trees of plastics material in which a first part of the tree is moulded of rigid material and this first part is then used as part of or an insert in a mould for forming a second part of the tree of flexible foamed self-skinning polyurethane material which is bonded to the first part in the moulding operation.

12 Claims, 4 Drawing Figures

3,888,070

SADDLE TREES AND SADDLES

BACKGROUND OF THE INVENTION

This invention relates to saddle trees and is particularly concerned with such trees formed from plastics material and with saddles incorporating such trees.

Conventionally, saddle trees used as a basis around which a riding saddle is built up are fabricated from several pieces of wood joined and strengthened by metal brackets and frequently covered by a stuck on canvas-like material. Such trees are in a skeleton-like form having a neck portion at the front end with depending points, the neck being extended rearwardly by two separated strips to form the waist and part of the seat of the tree and the rear ends of the strips being joined together with a member constituting the remainder of the seat and a cantle portion.

Such a tree bears only general resemblance to the finished shape of a saddle and needs to be built up by the addition of webbing, shaped padding and other material to constitute a preformed shape for receiving a covering of leather and other materials to constitute a finished saddle. The building up operation varies depending upon the particular style of finished saddle required and it is an expensive operation performed by an experienced saddler.

Some proposals have been made for producing plastics saddle trees, for example from resin moulded glass fibre material but these have generally provided a tree which is a direct substitute for the conventional trees referred to above and still requires the saddlery work referred to for building up into a shape suitable for receiving saddle covering material. British Pat. Specification No. 1,245,445 discloses a saddle tree of plastics material moulded so as more closely to conform to the shape of a built up tree but this still requires considerable work before saddle covering material can be fitted. It has also been proposed to injection mould a saddle tree from polypropylene material.

Another problem that arises with known saddle trees is that they readily break if a horse rolls of falls while wearing a saddle. In view of this and, in particular, with the skeleton like form of tree referred to above, it has been necessary, in order to provide acceptable strength characteristics, to have a tree of considerable weight. The tree together with its shaped padding may weigh several pounds and this inhibits a desired reduction in the overall weight of a finished saddle.

SUMMARY OF THE INVENTION

It is accordingly an object of the present invention to provide an improved saddle tree moulded from plastics material and an improved saddle.

One aspect of the present invention provides a method of making a saddle tree in which a substantially rigid first part of the tree is moulded of plastics material and thereafter a second resiliently compressible part of self-skinning foamed plastics material is bonded to the first part in a moulding operation in which the first part constitutes part of or an insert in the mould. Preferably the first part is of self-skinning foam plastics material.

The first part may be moulded as a neck portion with depending points and the second part may be moulded as a seat portion rearwardly of the neck portion and a cantle portion rearwardly of the seat portion. Alternatively, the first part may be moulded as a neck portion with depending points at least one mid-portion rearwardly of the neck portion and a cantle portion rearwardly of said mid-portion.

Preferably the tree incorporates a band of material the ends of which extend on each side of the tree and to which girth straps may be secured. The tree may also incorporate flexible material such as glass fibre mat as reinforcement.

The first and second parts of the tree may be longitudinally spaced apart and joined by a flexible coupling. The coupling may be one or more hinges or one or more solid or woven steel strips and the parts may be joined just forwardly of the waist of the tree. If desired, the tree may be in three parts having a further join between the seat and the cantle.

Alternatively, the tree may be weakened at a position just forwardly of the waist to facilitate bending. The weakening may comprise one or more slots formed through the material of the tree or may comprise one or more reduced thickness portions.

BRIEF DESCRIPTION OF THE DRAWINGS

The above and other aspects of the invention will now be described by way of example with reference to the accompanying drawings in which.

DESCRIPTION OF PREFERRED EMBODIMENTS

Figure 1:
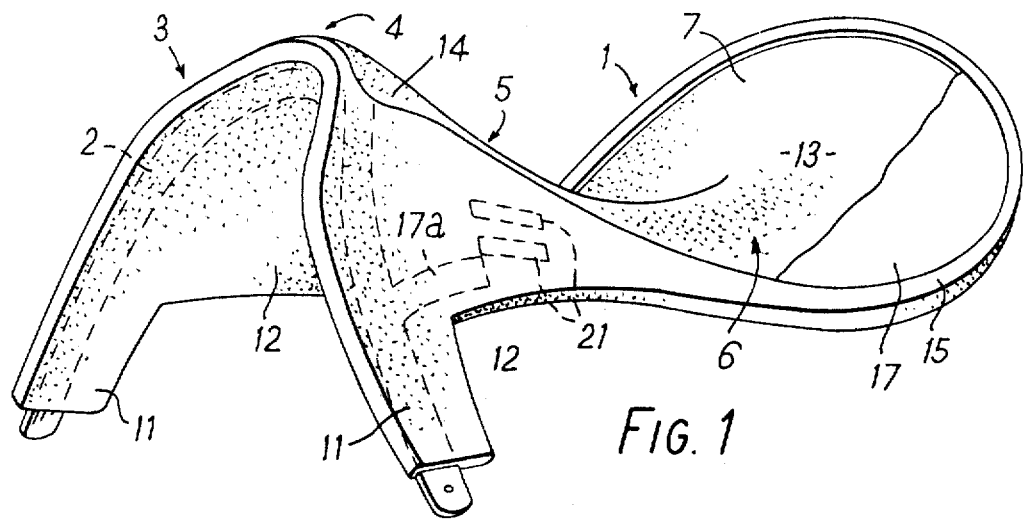
FIG. 1 shows a saddle tree in perspective with a part cut away.
Figure 2:
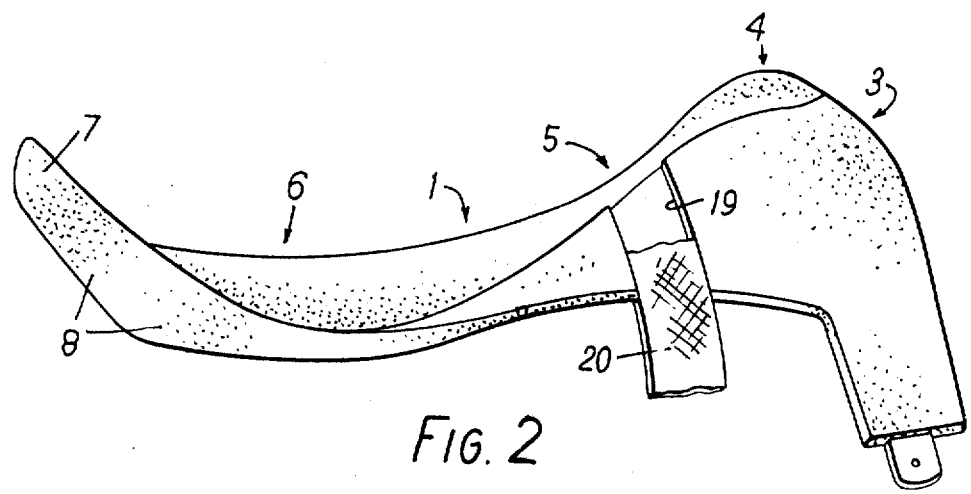
FIG. 2 is a side elevational view of the tree of FIG. 1.
Figure 3:
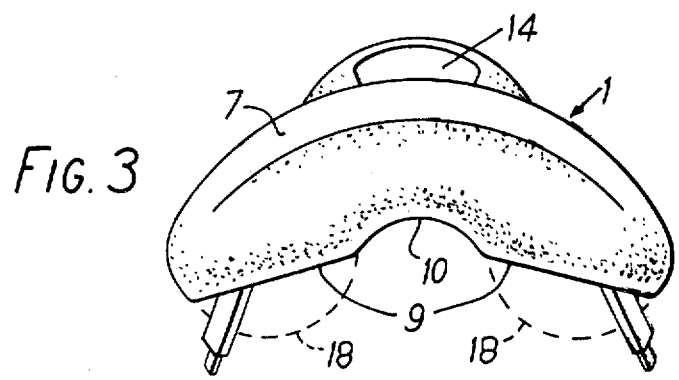
FIG. 3 is an end view of the tree of FIG. 1.

Referring to FIGS. 1 to 3 a saddle tree has a first part indicated generally at 1 moulded from rigid foam polyurethane material in one piece and may incorporate a moulded in front iron 2. The tree at its forward end 3 is of approximately uniform thickness having a raised and curved neck portion 4 extending rearwardly to a waist portion 5 and a seat portion 6. At the rear of the seat portion 6 the tree is curved upwardly to constitute a cantle 7. As shown particularly in FIG. 2 the material of the tree is considerably thickened at 8 towards the rear part of the seat portion and the cantle and on its underneath surface the tree is substantially flattened with a central ventilating groove 10. At its forward end and in conventional manner the tree extends downwardly on each side conforming to the shape of the front iron 2 to provide points 11 and generally flat portions 12 joining the upper ends of the points with the seat portion of the tree.

The upper surface of the part 1 is finished with a moulded recess 13 extending over substantially the whole of the seat portion and upper surface of the cantle portion leaving a narrow rim 15 therearound and the forward part 14 of the recess extends up the waist to the neck but terminates short of the forward end leaving a rim 16.

A cushion 17 (FIG. 1) of flexible foam polyurethane material is moulded directly into the recess 13 by placing a suitably shaped half mould (not shown) over the part 1 and injecting the polyurethane material therein to bond directly into the material of the part 1.

Stirrup safety bars may be rivetted to the front iron 2 and to a suitable rearward extension 17a thereof. The stirrup bars may be secured after moulding of the saddle tree or they may be rivetted to the front iron prior to moulding of the part 1 of the tree.

It will be understood that the tree so far described approximates on its upper surface with the shape required for drawing on the finished leather covering of the saddle and so far as its lower surface is concerned needs the addition of rolls of padding 23 (FIG. 3) extending along flats 9 and around the rear part of the cantle 7. This padding could at least in part be formed by the same flexible polyurethane material in a moulding process carried out at the same time as formation of the cushion 17 and by using a further half mould on the lower surface of the tree.

As shown in FIG. 2 the part 1 of the tree may be formed with a transverse recess or channel 19 to accommodate a strip of webbing 20 which becomes bonded into the flexible material and extends downwardly on each side of the tree to enable girth straps to be secured thereto. The recess 19 also provides a point of weakening in the material of the part 1 which facilitates flexing of the tree at that position. Similar flexing could be achieved by slots such as 21 (FIG. 1) extending partially or wholly through the thickness of the material of the part 1. Although the slots have been shown as extending longitudinally of the tree they could extend transversely thereof and if desired could be formed further towards the rear of the tree.

Figure 4:
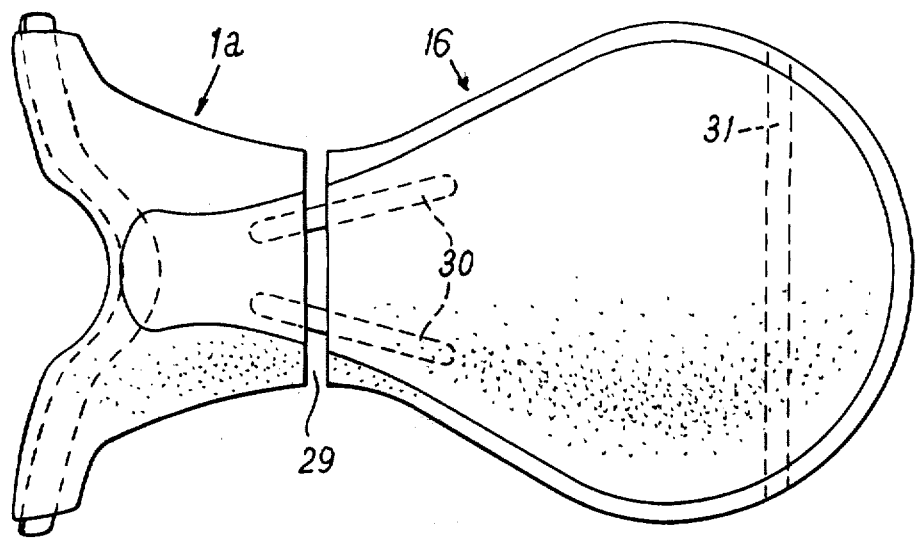
FIG. 4 is a plan view of another construction.

FIG. 4 of the drawings shows another arrangement basically similar to FIG. 1, but in which the rigid part of the tree is formed of longitudinally spaced parts 1a and 1b separated at the waist and leaving a gap 29 therebetween. The parts 1a and 1b are formed in a single moulding operation and linked by moulded-in strips 30 of sprung steel strip or woven steel strip constituting a flexible coupling between the parts. The strips are preferably located in the same plane so as to permit ready flexing of the parts. The gap 29 may conveniently be filled by the flexible foam material used for the cushion 17. With this construction the two parts of the tree may flex relative to one another through a considerable angle without risk of breaking either part of the tree and thereafter returning to its original shape.

It has been found that when a horse wearing a saddle rolls or falls the tree tends to break at the waist so that the construction of FIG. 4 reduces very considerably the risk of such breakage. Moreover, since the whole load of the rider is carried by the forward part 1a of the tree and the latter, via conventional girth straps, is the only part secured to the horse the rear part 1b may readily be arranged to flex as described without inhibiting any conventional riding habits. Although a pair of strips 30 has been described it will be understood that a single central strip could be provided or indeed the parts could be loosely hinged together. Furthermore, since the tree is more liable to flex in one direction than the other the coupling between the parts could be located adjacent a surface thereof and the edges of the gap 29 formed with a generally -V- formation.

Since a saddle tree sometimes breaks at the cantle and also since a rider falling hard on the cantle may sustain injury the cantle may also be formed separately and coupled with the remainder of the saddle tree by flexible couplings at a position indicated generally at 31.

In covering a conventional saddle tree with a leather seat the latter is stretched on wet, allowed to dry in order to conform to the shape of the tree then removed to have skirt portions stitched on and is subsequently replaced on the tree. With a tree according to the present invention the seat, carrying skirt portions, may be cut accurately to shape and bonded directly to the upper surface of the cushion 17 during the moulding operation of the latter. This can be done by preforming leather or plastics material.

It will also be understood that conventional girth straps may be moulded directly into the portions 12 instead of the conventional practice of stitching these to webbing bands. It would also be possible to mould conventional skirts directly into the side edges of the tree.

Although using conventional leather covering for the saddle tree is possible either with hand stitching or moulding as described above it will be understood that the material of the tree lends itself particularly to the use of plastics covering which may readily be finished to provide a leather grained effect indistinguishable from natural leather.

In addition it will be understood that by varying the amount of moulding powder used in the moulding of the basic tree considerable variations of density can be obtained. In practice with comparatively high density material a very rigid tree can be produced weighing several pounds but by using low density material a much more flexible tree weighing only approximately one pound can be moulded. The latter readily permits a finished saddle to be produced having a total weight of about seven pounds.

We claim:

1. A method of making a saddle tree which comprises moulding in one operation a first substantially rigid part of the tree comprising a front neck portion, a mid-waist and seat portion, and a rear cantle portion from plastics material, thereafter while using the first part as a mould part, moulding a second resiliently compressible part of self-skinning foamed plastics material to provide a resilient cushion bonded to at least the majority of the upper surface of the seat and cantle portions of the first part and additionally moulding padding to bond to the rear and underside of the cantle portion.

2. A method of making a saddle tree which comprises moulding in one operation a first substantially rigid part of the tree comprising a first neck portion, a mid-waist and seat portion, and a rear cantle portion from plastics material so that the first part defines a recess over at least a portion of its upper surface and thereafter while using the first part as a mould part placing a half-mould over the upper surface of the first part to define a mould cavity and injection moulding into that mould cavity to form a second resiliently compressible part of self-skinning foam plastic material to provide a resilient cushion bonded to at least the majority of the upper surface of the seat and cantle portions of the second part.

3. A method according to claim 2 in which the first part is moulded from self-skinning foam plastics material.

4. A method according to claim 2 which comprises incorporating in the plastics material a band of material the ends of which extend on each side of the tree and to which girth straps may be secured.

5. A method according to claim 2 which comprises incorporating flexible material such as glass fibre mat as reinforcement.

6. A saddle tree comprising a first substantially rigid part having a front neck portion, a mid waist and seat portion and a rear cantle portion, all of moulded plastics material, at least the neck part and the waist and seat part being spaced longitudinally from one another and connected by flexible coupling means, and a second cushion part of resiliently compressible self-skinning foamed plastic material bonded to the first part and extending over at least the majority of the upper surface of the seat and cantle portion of the first part.

7. A saddle tree according to claim 6 in which the waist and seat portion are spaced longitudinally from the cantle portion and connected by flexible coupling means.

8. A saddle tree according to claim 6 in which the coupling is selected from the group comprising one or more hinges and one or more solid or woven steel strips.

9. A saddle tree according to claim 8 in which the tree is in three parts having a further join between the seat and the cantle.

10. A saddle tree comprising a substantially rigid first part having a front neck portion, a mid-waist and seat portion and a rear cantle portion all of moulded plastics material, the first part being weakened at a position just forwardly of the waist to facilitate bending and a second cushion part of resiliently compressible self-skinning foamed plastic material bonded to the first part during moulding thereof and extending over at least a majority of the upper surface of the seat and cantle portion of the first part.

11. A saddle tree according to claim 10 in which the weakening comprises at least one slot formed through the material of the first part of the tree.

12. A saddle tree according to claim 10 in which the weakening comprises at least one portion of the first part of reduced thickness.

* * * * *